Figure 1:
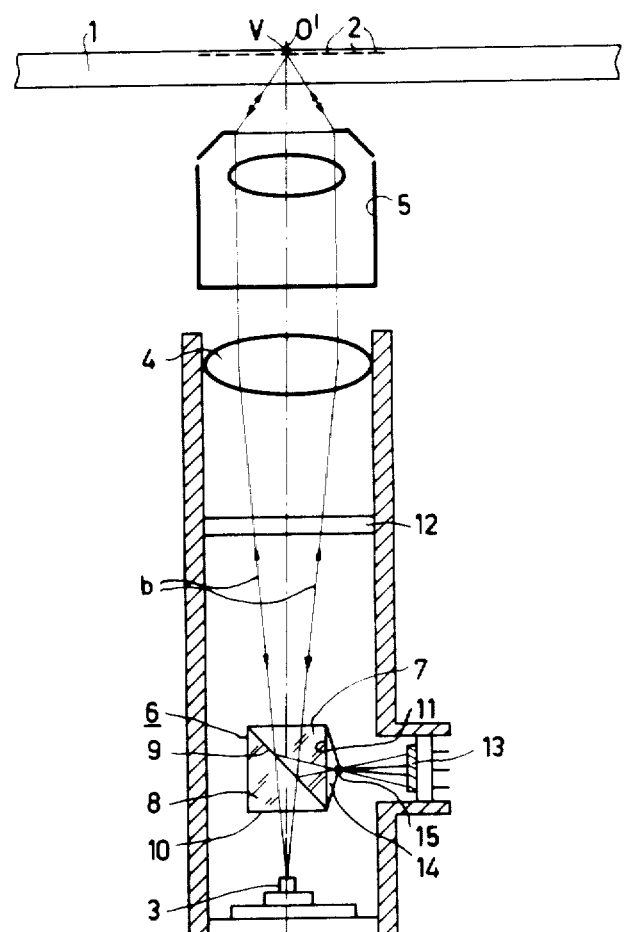

United States Patent [19]

Verhoeven et al.

[11] Patent Number: 4,489,408

[45] Date of Patent: Dec. 18, 1984

[54] BEAM-SPLITTING PRISM, METHOD OF MANUFACTURING SAID PRISM, AND OPTICAL READ AND/OR WRITE UNIT PROVIDED WITH SAID PRISM

[75] Inventors: Johannes M. G. Verhoeven; Herman M. A. Amendt, both of Eindhoven, Netherlands

[73] Assignee: U.S. Philips Corporation, New York, N.Y.

[21] Appl. No.: 328,969

[22] Filed: Dec. 9, 1981

[30] Foreign Application Priority Data

Oct. 8, 1981 [NL] Netherlands ............... 8104588

[51] Int. Cl.³ ............................................. G11B 7/00
[52] U.S. Cl. ............................. 369/112; 350/286; 369/46; 425/110

[58] Field of Search ............... 369/100, 112, 44–46, 369/54, 109–111; 350/286, 170, DIG. 1; 425/110, 464, 543, 808

[56] References Cited

U.S. PATENT DOCUMENTS 2,178,245 10/1939 Schwarz .......................... 369/112

OTHER PUBLICATIONS

"PCM-Schallplatte für die 80-er Jahre", Radio Mentor, vol. 45, 1979, pp. 138–140.

*Primary Examiner*—Raymond F. Cardillo, Jr.
*Attorney, Agent, or Firm*—Robert T. Mayer; Algy Tamoshunas

[57] ABSTRACT

A beam-splitting prism provided with a roof-edge prism is described. The roof-edge prism is made of a cured transparent synthetic material and can be arranged on a surface of the beam-splitting prism in a simple and cheap manner.

7 Claims, 4 Drawing Figures

1-Ⅱ-PHN 10173

BEAM-SPLITTING PRISM, METHOD OF MANUFACTURING SAID PRISM, AND OPTICAL READ AND/OR WRITE UNIT PROVIDED WITH SAID PRISM

The invention relates to a beam-splitting prism comprising an entrance surface for a radiation beam, a beam-splitting surface, and an exit surface for a radiation beam which has been deviated inside the prism, which entrance surface and exit surface form part of prismatic glass elements, a roof-edge prism having a refractive edge being arranged on the exit surface.

A read unit comprising such a prism is described in the article: "PCM-Schallplatte für die 80er Jahre" in "Radio Mentor" 45 (1979), page 138–140. This read unit comprises a radiation source in the form of a solid-state laser. The radiation beam emitted by said laser is focussed by means of an objective system onto an information structure formed on a round disc-shaped record carrier. The read beam reflected by the information structure traverses the objective system a second time and then passes through a splitting prism arranged between the radiation source and the objective system. Said prism couples the modulated read beam out of the path of the radiation beam emitted by the source, so that the modulated beam can impinge on a radiation-sensitive detection system which supplies an electric signal which is in conformity with the modulation of the last-mentioned beam.

For reading an information structure with minute-information details, for example of the order of magnitude of 1 μm or smaller, an objective having a large numerical aperture is required. The depth of focus of such an objective system is small. Since the distance between the information structure and the objective system may be subject to variations in excess of said depth of focus, steps must be taken to enable said variations to be detected and the focussing to be corrected in response thereto. For this purpose, a roof-edge prism may be arranged on the exit surface of the splitting prism, as described in said article. Said prism splits the beam into two sub-beams which impinge on separate elements of the radiation-sensitive detection system. Said system comprises four radiation-sensitive elements arranged on a line which is transverse to the refractive edge of the roof-edge prism. By subtracting the sum of the signals supplied by the two inner detection elements from the sum of the signals supplied by the two outer detection elements a signal is obtained which is proportional to a focussing error.

Until now the roof-edge prism was manufactured as a separate element from high-grade optical glass and was subsequently mounted on the splitting prism. The roof-edge prism has relatively small dimensions and is very vulnerable. It must have a large apex angle, for example between 170° and 180°, and is difficult to manufacture with the required accuracy and without burrs, which may affect the radiation distribution over the detection elements and hence the output signals of these elements. Apart from manufacturing and handling problems, problems arise as regards the required accuracy of the alignment of the roof-edge prism relative to the splitting prims.

It is an object of the present invention to eliminate said problems and to provide a splitting prism provided with a roof-edge prism which can be manufactured simply and has a low cost-price. The splitting prism according to the invention is characterized in that the roof-edge prism is made of a cured transparent synthetic material.

The invention utilizes the fact that the roof-edge prism is a thin element, so that the material of this prism need not comply with such stringent requirements as the material of the splitting prism, which is traversed by the incident read beam by means of which a radiation spot is to be formed which complies with very stringent requirements.

Various transparent plastics or lacquers may be used as materials for the roof-edge prism, provided that they can be applied to the splitting prism in a satisfactorily liquid condition and can subsequently cure, for example, thermally or under the influence of radiation. A preferred embodiment of the splitting prism is characterized in that the roof-edge prism is made of a synthetic material which cures under the influence of ultraviolet radiation.

In accordance with the invention the method of manufacturing a splitting prism provided with a roof-edge prism is characterized in that a drop of a liquid synthetic material is applied to the exit surface of the beam-splitting prism, a die having a die surface comprising two die surface portions which enclose an obtuse angle is pressed into the drop of synthetic material, the material is made to cure, and the die is removed.

By means of an adjustment tool the die can be positioned and aligned with the required accuracy. This enables the direction and the position of the refractive edge of the roof-edge prism relative to the prism support and hence relative to the optical axis of the system to which the splitting prism belongs to be defined correctly and independently of the orientation of the exit surface of the splitting prism. This is because the entire space between said surface and the die is filled with transparent synthetic material.

If the synthetic material is an ultraviolet-curing substance use is preferably made of a transparent die, so that the substance can be exposed through said die.

To facilitate separation of the die from the cured substance the die is preferably provided with an anti-adhesion layer.

Figure 2:
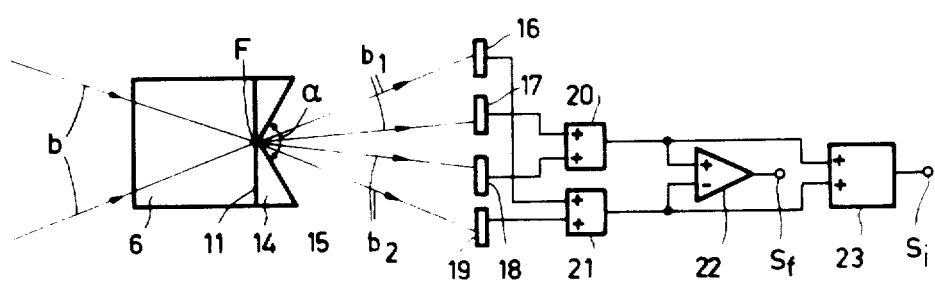
Figure 3:
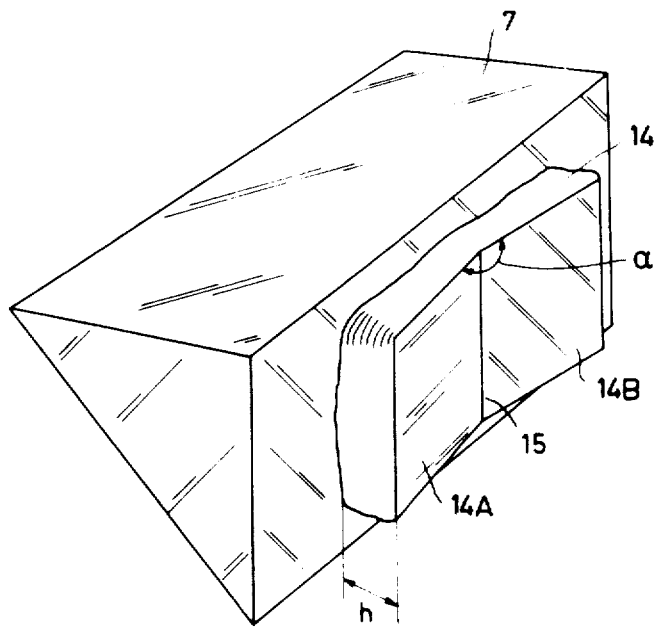
Figure 4:
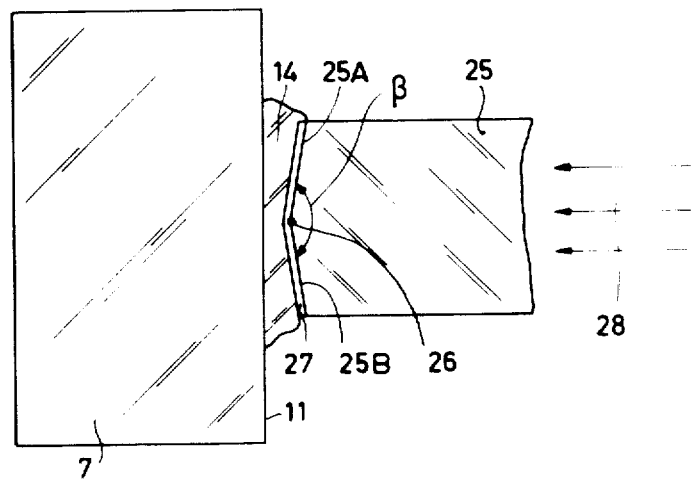

The invention will now be described in more detail with reference to the drawing, in which:

FIG. 1 shows a longitudinal section of an embodiment of an optical read unit equipped with a beam-splitting prism and associated roof-edge prism, FIG. 2 is a plan view of the beam-splitting prism and the associated radiation-sensitive detection system, FIG. 3 is a perspective view of a part of the splitting prism provided with a beam-splitting roof-edge prism, and FIG. 4 illustrates how the roof-edge prism is manufactured.

FIG. 1 shows a small part of a round disc-shaped record carrier 1 in radial cross-section. The radiation-reflecting information structure is disposed on the upper side of the record carrier and comprises a multitude of information areas arranged in information tracks 2. The information structure is scanned by means of a radiation source 3, for example a solid-state laser, which produces a read beam b. A lens 4 forms the divergent beam into a parallel beam of such a cross-section that the pupil of an objective system 5 is properly filled. Said objective system then forms a radiation spot V of minimal dimensions onto the information structure.

The read beam is reflected by the information structure and, as the record carrier moves relative to the read beam, the reflected beam is modulated in time in conformity with the information stored in the record carrier. In order to separate the modulated beam from the beam emitted by the radiation source a beam-splitting prism 6 is arranged between the radiation source and the objective system. Said prism may comprise two prismatic elements 7 and 8 between which a beam-splitting layer 9 is disposed. The prism 6 has an entrance surface 10 and an exit surface 11. The layer 9 may be a semitransparent mirror. In order to minimize the radiation loss in the read unit the use of a polarization-sensitive splitting layer is preferred. Between the objective system and the prism 6 a $\lambda/4$ plate 12 is then arranged, $\lambda$ being the wavelength of the read beam b. Said prism is traversed two times by the read beam and rotates the plane of polarization of said beam through 90° in total. The beam emitted by the radiation source is then almost fully transmitted by the prism, whereas the modulated beam is almost fully reflected towards a radiation-sensitive detection system. This system supplies a signal which is modulated in accordance with the information stored in the record carrier.

In order to generate a focussing-error signal which provides an indication of the magnitude and direction of a deviation between the plane of focussing of the objective system and the plane of the information structure a roof-edge prism 14 is arranged on the exit surface 11 of the beam-splitting prism 6 and the radiation-sensitive system 13 is formed by four radiation-sensitive elements. These elements are designated 16, 17, 18 and 19 in FIG. 2, which illustrates the principle of focussing-error detection. Said Figure is a plan view of the beam-splitting prism with the roof-edge prism. The refractive edge 15 of the prism 14, as is shown in FIG. 2, may be parallel to the optical axis, 00' in FIG. 1, of the read unit. However, it is alternatively possible, as is shown in FIG. 1, to rotate the roof-edge prism and the array of detection elements through 90°, so that the refractive edge 15 is disposed transversely of the optical axis 00'. The refractive edge may also be in an intermediate position between the positions parallel and transverse to the optical axis 00'.

The roof-edge prism splits the beam b into two sub-beams $b_1$ and $b_2$ which co-operate with the detection elements 16, 17 and the elements 18, 19 respectively.

After having passed through the beam-splitting prism the two beam halves of the read beam may have different intensities, that is to say, in the embodiments shown in FIGS. 1 and 2 the upper half of the beam reflected by the splitting surface 9 may have a lower intensity than the lower half. In order to prevent different intensities of the sub-beams $b_1$ and $b_2$ as a result of said effect, the refractive edge of the roof-edge prism is preferably disposed parallel to the optical axis 00'.

FIGS. 1 and 2 represent the situation in which the read beam is focussed exactly on the plane of the information structure. The read unit may be adapted so that the focus of the reflected beam is situated exactly on the refractive edge 15 of the roof-edge prism 14. In the case of a correct focussing the sub-beam $b_1$ and $b_2$ are symmetrically incident on their associated detection elements 16, 17 and 18, 19 respectively. In the case of a focussing error the energy distribution within the respective sub-beam $b_1$ or $b_2$ relative to the associated detection elements changes, which may also be regarded as a displacement of the sub-beam relative to the detection elements. If the focus of the beam emitted by the radiation source is situated above the plane of the information structure, the focus F of the reflected beam will be situated to the right of the edge 15 in FIG. 2. This would correspond to an inward displacement of the beams $b_1$ and $b_2$, so that the detection elements 16 and 19 would receive less radiation energy than the detection elements 17 and 18. If the focus of the read beam emitted by the radiation source is situated below the plane of the information structure, the situation would be reversed and the detection elements 17 and 18 would receive less radiation energy than the detection elements 16 and 19. By applying, as is shown in FIG. 2, the signals from the detection elements 17 and 18 to a first adder 20 and those from the elements 16 and 19 to a second adder 21 and applying the output signals of these adders to a differential amplifier 22, a focussing-error signal $S_f$ is obtained. The information signal $S_i$ can be recovered by means of a third adder 23 whose inputs are connected to the adders 20 and 21.

Alternatively, the read unit may be constructed so that in the case of a correct focussing the focus F of the reflected beam is disposed in the plane of the detection elements. If the focus of the beam emitted by the radiation source is then situated too high, the focus F will have shifted to the right but the detection elements 16 and 19 will receive more radiation energy than the detection elements 17 and 18.

Instead of four radiation-sensitive elements the detection system may comprise three such elements, for example only the elements 16, 17 and 18 of FIG. 2. The focussing-error signal is then obtained by subtracting the output signals of the detection elements 16 and 17 from each other and the information signal is obtained by adding the output signals of the three elements 16, 17 and 18 to each other.

Either the base or the refractive edge 15 of the roof-edge prism 14 may be disposed against the exit surface 11 of the beam-splitting prism, as is shown in FIG. 1 and FIG. 2 respectively. When a high value is selected for the apex angle $\alpha$ of the roof-edge prism, for example approximately 170°, the prism 14 will have substantially the same effect in both cases. The apex angle is selected as large as possible in order to enable the detection elements to be arranged as close as possible to each other and to be constructed as one integrated detector.

In accordance with the invention the roof-edge prism is made of a cured synthetic material. FIG. 3 is an exaggerated perspective view of a prism half 7 of the beam-splitting prism on which a roof-edge prism 14 is arranged. In a practical embodiment the prism had a base area of $4 \times 4$ mm$^2$, a maximum height h of the order of 200 $\mu$m and an apex angle $\alpha$ of approximately 170°.

FIG. 4 schematically represents how the roof-edge prism can be manufactured. A drop of, for example, a transparent substance which cures upon exposure to ultraviolet light is applied to the exit surface 11 of the prism element 7, which is shown in plan view. A die 25 of a tool, not shown, is positioned with the desired high accuracy, so that the line of intersection of the two die surface portions 25A and 25B is situated at the correct distance from the central axis of the beam-splitting prism support, not shown, and said axis is oriented correctly relative to the optical axis 00', i.e. is parallel or transverse to said optical axis. Subsequently, the drop of synthetic material is exposed to ultraviolet radiation 28, exposure through the die being possible when a transparent die is used. After the material has cured the die is withdrawn. The die may be provided with an anti-adhesion coating in order to facilitate its separation from the cured material.

In the case of exposure through the die, the die material should be sufficiently transparent to ultraviolet radiation only. Exposure is also possible via the beam-splitting prism. Then the prism material should be satisfactorily transparent to both ultraviolet and read-beam radiation. In the case of exposure through the beam-splitting prism the area exposed is larger than in the case of exposure via the die, so that excess synthetic material outside the die surface can also be cured.

Instead of ultraviolet-curing substances it is possible to employ other synthetic materials which can be applied in a more or less liquid condition and which upon application of the die cure under the influence of heat or in cold condition, such as epoxy-resins, or under the influence of radiation other than ultraviolet radiation.

Preferably, use is made of a die as shown in FIG. 4, having a projecting die surface and by means of which a roof-edge prism as shown in FIG. 3 can be obtained. The risk of air bubbles in the roof-edge prism thus manufactured is then minimized and if the synthetic material shrinks it may be replenished with additional material from outside the die surface.

The beam-splitting prism 6 comprises two elements 7 and 8, one of which carries the splitting surface 9. The two elements may be secured to each other by means of an ultraviolet-curing cement. Assembly of the beam-splitting prism and formation of the roof-edge prism can be effected simultaneously using one fixture.

The invention has been described in connection with its use in an optical read unit, but may also be used in a write unit or in a combined write-read unit. The write unit is constructed in a similar way to the read unit described in the foregoing. For recording information, for example by melting pits into a metallic layer, more energy is needed than for reading and, in addition, the wirte beam should be modulated in time in accordance with the information to be written. The radiation source for the write unit may be a gas laser, such as a HeNe-laser, a modulator, such as an electro-optical or acoustic-optical modulator, being arranged in the path of the write beam. It is alternatively possible to use a diode laser, the write beam being modulated by varying the electric current through the diode laser, so that no separate modulator is needed.

What is claimed is:

1. A beam-splitting prism comprising an entrance surface for a radiation beam, a beam-splitting surface and and exit surface for a radiation beam which has been deviated inside the prism, which entrance surface and exit surface form part of prismatic glass elements, and a roof-edge prism having a refractive edge arranged on the exit surface, said roof-edge prism being formed from a transparent, curable liquid synthetic material which is deposited on said exit surface and cured in situ after said refractive edge is formed by a die in said liquid material.

2. A beam-splitting prism as claimed in claim 1, wherein the roof-edge prism is made of a synthetic material which cures under the influence of ultraviolet radiation.

3. A method of making a transparent beam-splitting element having an entrance surface for a radiation beam, a beam-splitting surface, an exit surface for a radiation beam which has been deviated inside said element, and a roof-edge prism arranged on the exit surface, said method comprising the steps of depositing on the exit surface a quantity of curable, liquid synthetic material which is transparent to the radiation when cured, forming a refractive edge in said material by a die, curing said material, and removing said die.

4. The method according to claim 3 wherein said material is curable by ultraviolet light and said die is transparent to said ultraviolet light and wherein said curing step includes the step of directing ultraviolet light through said die so as to expose said material to said ultraviolet light.

5. The method according to claim 3 or 4 including the step of providing said die with an anti-adhesion coating prior to said forming step.

6. The method according to claim 3 or 4 wherein said die has two surface portions inclined at an obtuse angle with respect to each other and wherein said forming step includes pressing said surface portions into said material to thereby form said refractive edge.

7. An optical read and/or write unit for reading and/or recording information areas in a radiation-reflecting information surface, said unit comprising a radiation source, an objective system for focusing a beam of radiation emitted by said radiation source to a radiation spot on the information surface, a beam splitting element arranged between said radiation source and said objective system for diverting radiation which has been reflected by the information surface out of the path of the beam emitted by the source, and a roof-edge prism arranged on an external surface of said beam splitting element in the path of said diverted radiation, said roof-edge prism being formed from a transparent, curable liquid material which is deposited on said external surface and cured in situ after said refractive edge is formed by a die in said liquid material.

* * * * *